June 15, 1954
S. G. MOCK
2,680,881
COMPRESSION MOLDING DEVICE
Filed Oct. 11, 1951
3 Sheets-Sheet 1
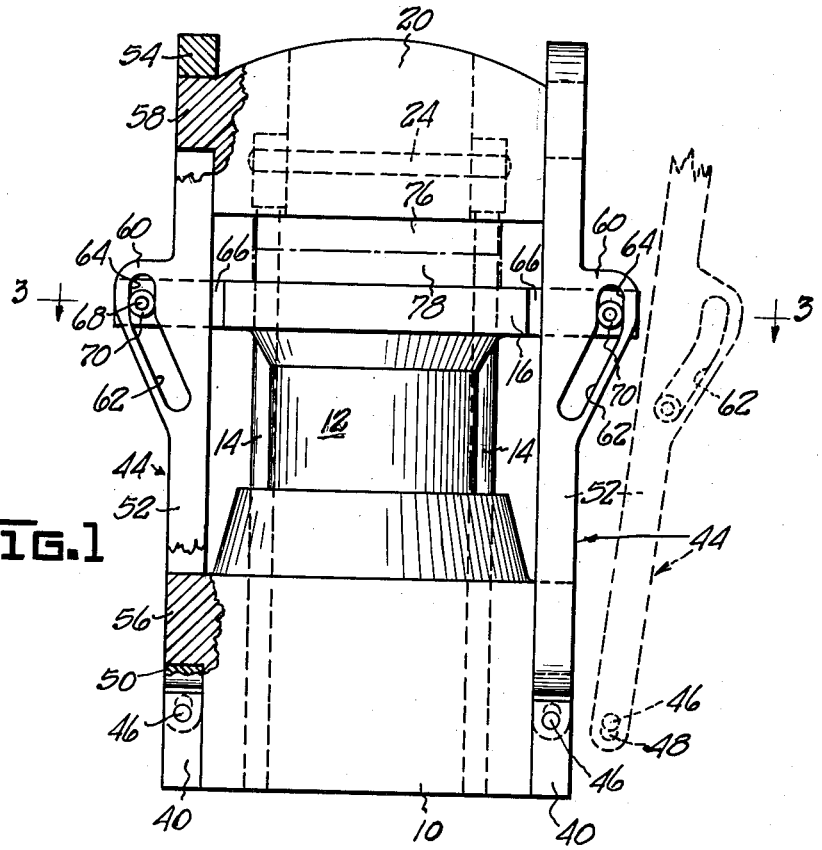
INVENTOR.
STANLEY G. MOCK.
BY
Oltsch & Knoblock
ATTORNEYS

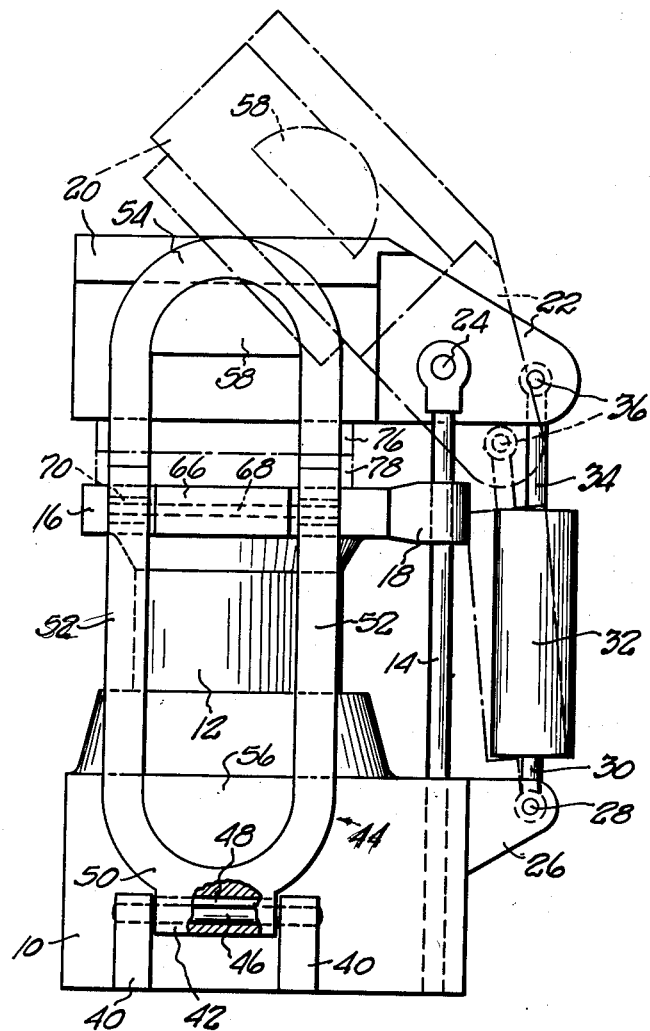

June 15, 1954     S. G. MOCK     2,680,881
COMPRESSION MOLDING DEVICE

Filed Oct. 11, 1951     3 Sheets-Sheet 3

INVENTOR.
STANLEY G. MOCK
BY
Oltsch + Knoblock
ATTORNEYS

Patented June 15, 1954

2,680,881

UNITED STATES PATENT OFFICE 2,680,881

COMPRESSION MOLDING DEVICE

Stanley G. Mock, Goshen, Ind.

Application October 11, 1951, Serial No. 250,819

1 Claim. (Cl. 18—16)

This invention relates to improvements in compression molding devices usable for molding rubber, synthetic rubber, plastic materials, synthetic resins and the like.

In the operation of molding rubber and like materials by compression, particularly in cases where large articles are molded or where multiple cavity molds are used, the conventional practice heretofore has entailed the assembly of the mold containing the material to be molded, the placement of the assembly in the press, the operation of the press to perform the molding operation, the opening of the press to afford access to the mold, and the removal of the assembled mold to a working station or table at which the mold parts are separated, the molded articles are removed, the mold is soaped, the mold is reloaded, and the loaded mold is reassembled preparatory to reinsertion in the press.

The application of high pressure to the mold during the molding operation causes the mold to be closed tight, and, consequently, the separation of the parts of the mold by hand is time-consuming and laborious. Usually, the mold parts must be pried apart. The handling and manipulation of the mold parts manually in the sequence of operations mentioned above is laborious because of the heavy weight of the mold. The large number of manual operations required are time-consuming, and, consequently, the cycle time for a molding operation is high, with the result that the unit cost of the molded article is higher than would be the case if a faster cycle time could be secured.

It is the primary object of this invention to provide a device which eliminates a large part of the manual labor required in the molding operation, which eliminates the necessity to manually handle the mold parts, and which permits increase of the speed at which the molding cycle is performed, so as to permit increased production and to lower the labor and processing cost of each article molded.

A further object is to provide a device of this character having movable upper and lower platens, in which the upper platen is tilted when the press is open to facilitate inspection of and access to the cavity of a mold part carried thereby.

A further object is to provide a device of this character having a movable power-actuated platen and a movable reaction platen, wherein anchor means are releasably engageable with the reaction platen to enable the same to withstand molding pressure exerted by the first named platen during the molding operation.

A further object is to provide a molding press having a base, a power-actuated shiftable platen, a pivoted reaction platen, a yoke releasably engageable with the reaction platen to hold the same in pressure reaction position, wherein means carried by the power-actuated platen react with the yoke to shift said yoke between an operative reaction sustaining position and an inoperative releasing position.

Other objects will be apparent from the following specification.

In the drawings:

Fig. 1 is a front view of the press, illustrating in dotted lines alongside the same, a second position of one of the parts of the press.

Fig. 2 is a side view of the press, illustrating the same in molding position in full lines, and illustrating the upper platen in inoperative position in dotted lines.

Fig. 3 is a transverse horizontal sectional view taken on line 3—3 of Fig. 1.

Fig. 5 is a fragmentary sectional view taken on line 3—3 of Fig. 1 and illustrating a modified embodiment of the invention.

Figure 4:
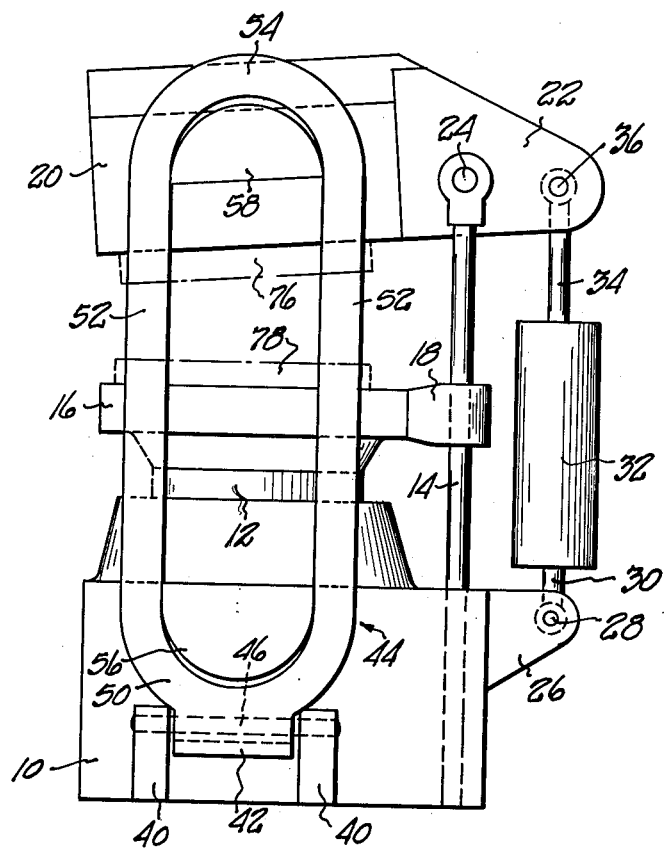
Fig. 4 is a side view, illustrating in intermediate position of the press in its opening action.

Referring to the drawings which illustrate the preferred embodiment of the invention, the numeral 10 designates the base of a press in which a ram 12 is slidable in a vertical path. The press base will house mechanism for actuating the ram between a retracted position, as illustrated in Fig. 4, and an elevated position, as illustrated in Fig. 2. The ram will preferably be a hydraulic ram, and suitable control means (not shown) will be accessible to an operator working at the press, for the purpose of controlling the necessary valves, pumps and other elements (not shown) required for the operation of the ram 12. These valves, pumps and other controls may be of any character well known in the art and therefore believed to be unnecessary for specific illustration or description.

Two or more rigid upright guide bars 14 are carried by the base 10 at the rear thereof. These bars, together with the base 10, constitute the frame of the device. A platen member 16 normally bears upon the top of the ram 12 and has ears 18 projecting therefrom at its rear and apertured and preferably provided with bearings of any suitable character which fit slidably upon the rods 14. By this arrangement the vertical movement of the lower platen 16 is controlled by the ram 12 and the guiding and positioning of said platen is controlled from the fixed guide rods 14.

The press includes an upper platen or head 20 normally positioned in register with the lower platen 16 when in operative molding position as illustrated in full lines in Fig. 2. The upper platen 20 preferably includes a reduced rearwardly projecting part 22 of a width narrower than the spacing between the upright guide bars 14 so as to accommodate pivotal connection with said guide rods at 24.

The base 10 preferably includes a rearwardly projecting part 26 to which is pivotally connected at 28 an end part 30 projecting longitudinally from the cylinder of a power member 32 which preferably constitutes a cylinder-piston unit and which may operate either pneumatically or hydraulically. The power member 32 can be either of the double acting type or the single acting type, and, where of the single acting type, will have its power-actuated stroke acting in a manner to contract or reduce the overall dimension of the power unit. The power unit will include a piston stem 34 projecting from the upper end of the power member and pivotally connected at 36 preferably to the rear part 22 of the upper platen 20. The pivot 36 will be spaced rearwardly from the pivot 24 in the position of the parts illustrated in dotted lines in Fig. 2, and the pivot 28 will likewise be positioned rearwardly relative to guide bars 14. The arrangement will be such that clearance will be provided between the parts, and in this connection it will be observed that the bars 14 will be spaced apart a distance greater than the cross-sectional dimension of the power member 32, so as the said power member swings forwardly to the position illustrated in dotted lines in Fig. 2, it will pass between the projections 18 at the rear of the lower platen 16 and also between the bars 14 so that the parts may operate freely.

The base 10 at each side thereof includes a pair of projections or ribs 40 spaced apart to receive therebetween with clearance the lower end portion 42 of an elongated yoke member 44, there being one yoke member at each side of the press. A rigid hinge or pivot bar 46 is carried by and extends between each pair of ribs 40, and the part 42 of the yoke has an aperture 48 therethrough of a size to receive the pivot rod 46 with clearance. As illustrated in Fig. 1, the aperture 48 is of oval cross-sectional shape but this is not necessary, and such aperture may be of circular cross-sectional shape if desired. The yoke 44 includes a lower fork portion 50, a pair of elongated upright arms 52, and an upper or head portion 54.

The ribs 40 are preferably located adjacent the bottom of the base 10, and an anchor member 56 projects laterally from the base at the upper part of each side thereof. Each projection 56 is so positioned that it is engaged by the inner surface of the lower part 50 of the yoke in the operative molding position illustrated in full lines in Fig. 2, and such abutment 56 preferably has a shape or contour complementary to the shape or contour of the inner surface of the lower part 50 of the yoke engageable therewith. The head platen 20 has a projection 58 at each side thereof adapted for engagement with the upper portion 54 of a yoke member in the operative molding position of the parts, and the upper surface of each abutment 58 preferably has a contour corresponding to the contour of the inner lower surface of the head portion 54 of the yoke engageable therewith.

Arms 52 of the yokes are of such length that the yokes will hold the upper platen 20 in the position illustrated in full lines in Fig. 2, with its bottom surface horizontal when the yoke part 50 engages the base projection or abutment 56 and the yoke end 54 engages the head platen projection or abutment 58.

At least one of the arms 52 of each yoke, and preferably both of said arms, carry cam members intermediate their ends and at a position or elevation spaced above the base 10 and below the head platen 20 in the normal or molding position of the parts illustrated in full lines in Fig. 2. These cams may be of any character found suitable and, as illustrated in Fig. 1, constitute integral ears or lateral projections 60 which are vertically elongated and which have formed therein longitudinally elongated slots 62 which are upwardly and outwardly inclined relative to the longitudinal dimension of the yoke. The inclined slot portions 62 merge with longitudinal slot portions 64 at their upper ends. The bottom slidable platen 16 includes lateral projecting portions 66 which are received between the arms 52 of the yokes with clearance. Each projection 66 mounts a shaft or rod 68 projecting therefrom at its front and back edges, and the projecting rod portions carry rollers 70 which extend into and are rotatable in the slots 62.

The cam units need not be formed integrally with the yoke as illustrated in Fig. 1, and, instead, may be formed separately from said yokes as illustrated in Fig. 5, and may be secured by bolts or other securing members 72. In the Fig. 5 construction the separate cam member 61 will either be longitudinally slotted to provide vertical adjustment of the position or location of the cam guide upon the yoke arm 52 with which it is associated, or some other means will be provided to afford such adjustment, which means may constitute, alternatively, the provision of longitudinally spaced bolt-receiving openings spaced apart along the length of the yoke arms 52 or may include a plurality of longitudinally spaced bolt-receiving apertures formed in the cam member 61. I prefer to use a construction in which the cam guides are vertically adjustable upon yoke arms 52 in order to accommodate differences in the stroke of the ram 12 and the platen 16 as may be necessary to adapt the press for use with molds of different vertical dimensions.

In the use of the device, the upper part 76 of a mold is fixedly secured or anchored to project downwardly from the bottom surface of the head platen 20, and the lower part 78 of the mold is preferably anchored or fixedly secured to the bottom platen 16. The molds of the platen will preferably be provided with suitable apertured or tapped bores (not shown) to receive machine studs or like securing members (not shown) for the purpose of detachably anchoring the mold parts to the press platens.

In the open or loading position of the device, the ram 12 and the lower platen 16 will assume a low level position as illustrated in Fig. 4, and the upper platen 20 will assume a tilted position as illustrated in dotted lines in Fig. 2. The low level position of the mold 78 will facilitate unloading of the mold, coating of the mold cavity with a soap solution, and then reloading of the mold. The tilted position of the upper platen exposes the cavity of the mold part 76 for inspection and holds the mold part 76 in a convenient position to facilitate coating with soap solution.

Adequate clearance is provided between the two mold parts to facilitate convenient and ready access. After the mold has been loaded, the upper platen 20 is permitted to tilt to the position illustrated in Fig. 4. This is accomplished by control of the power member 32. Thereupon the ram 12 is operated to elevate the lower platen 16 and the bottom mold part 78 to bring the mold parts 76 and 78 into operative molding relation to one another, as illustrated in Figs. 1 and 2.

When the device is in open position with the ram 12 lowered, the yoke members 44 will be positioned in outwardly tilted or inclined position, as illustrated in dotted lines in Fig. 1. This position will be determined by and will be caused by the rollers 70 in the cam slots 62, 64. These parts are so related that when the rollers 70 are at the lower ends of the cam slots as a result of lowering of the ram 12, the yokes 44 will be tilted outwardly. Thus, in the loading position of the device, the two yokes are spread apart relative to the position illustrated in full lines in Fig. 1, thereby increasing the operative clearance and increasing the accessibility of the mold parts. When the mold is being closed by upward movement of the ram 12, the rollers 70 traverse the inclined slots 62 and take a position in the upper slot portion 64. This action cams the yokes 44 into the upright position illustrated in Fig. 1.

The power member 32 preferably has a stroke sufficient to permit movement of the head platen between the tilted position illustrated in dotted lines in Fig. 1, and the position illustrated in Fig. 4. Observe in the Fig. 4 position that the bottom surface of the head platen is inclined forwardly and downwardly at a slight angle. Suitable stop means (not shown) may be provided, if desired, to limit the extent of downward forward tilting of the upper platen and to hold the upper platen in the Fig. 4 position after the stroke of the power member 32 has ended and before the lower platen 16 is elevated to the operative position. The feature just described, together with the feature of the free play at the pivot of the yoke provided by the relation of the size of the parts 46, 48, is of substantial importance in the successful operation of the device. The amplitude of the stroke or movement of the upper platen below an operative horizontal position must be properly correlated with the amplitude of the free play or lost motion provided at the pivot of the yoke.

Assuming that the mold parts have been prepared for the molding operation by coating thereof and loading of the raw material upon the lower platen, and that the upper platen has been lowered to the Fig. 4 position, the yokes will assume the position illustrated in dotted lines in Fig. 1, tilted outwardly and lowered slightly bodily relative to the full line position in Fig. 1. At the same time the bottom surfaces of the upper parts 54 of the yokes will be located at a level slightly above the level of the top surfaces of the projections 58 upon the upper platen. Consequently, when the lower platen 16 is elevated so as to cause the rollers 70 to traverse the cam slots 62, 64, the yokes 44 will be caused to swing inwardly from the Fig. 1 dotted position and will be permitted to pass clear of and around the projections 58 and 56 to avoid interference from those projections and to provide the necessary clearance for free and smooth working operation of the parts.

As the ram-actuated lower platen approaches the upper end of its stroke, the lower mold part 76 comes into contact with the upper mold part 76. The movement of the ram continues after the mold parts come in contact with one another and until the parts reach the position illustrated in Figs. 1 and 2, in which position the bottom surface of the upper platen will be horizontal and parallel to the upper surface of the lower platen so that all surfaces of the device will be normal to each other. This position is reached at the same time that the opposite ends of the yoke come into engagement with the projections 56 and 58. Consequently, continued application of pressure by the ram and lower platen to the molds is sustained by and acts directly against the two yokes 44.

After the molding operation has been completed, the first action in opening the mold is the action of lowering the ram 12 and the lower platen to the position illustrated in Fig. 4. At that time the yokes 44 are permitted to assume positions clear of the projections 56 and 58 incident to the initial lowering movement of the platen and incident to the movement of the rollers 70 in the upper portions 64 of the cam slots. This initial movement provides clearance between the yokes and the projections 56 and 58, and continued downward movement of the platen and the roller swings the yokes laterally outwardly. Thereupon, the power member 32 may be operated to tilt the upper platen to the dotted line position in Fig. 2.

The controls for the operation of the device are not here shown and may be of any type found suitable. Thus there may be separate manually actuable controls for the ram 12 and for the power member 32, or the controls for the ram and the power member may be suitably correlated to operate in proper sequence for opening and closing, as will be understood by those skilled in the art.

While the preferred embodiment of the invention has been illustrated and described herein, it will be understood that changes in the construction may be made within the scope of the appended claim without departing from the spirit of the invention.

I claim:

A compression molding device comprising a frame, upper and lower platens supported by said frame and each shiftable between an open position and a molding position, means for shifting said platens, a yoke pivoted to said frame for engaging and locking said upper platen in its molding position, and means carried by said lower platen for swinging said yoke between platen-engaging and platen-releasing positions, the pivot connection between said yoke and frame accommodating limited bodily lost motion of said yoke, said upper platen and said frame each having abutments engageable by said yoke when said yoke is in platen-engaging position and said platens are in molding position.

References Cited in the file of this patent

UNITED STATES PATENTS

| Number | Name | Date |
|---|---|---|
| 1,579,480 | Hoover | Apr. 6, 1926 |
| 1,628,057 | Nitchie | May 10, 1927 |
| 1,892,942 | Gammeter | Jan. 3, 1933 |
| 1,984,768 | Shook | Dec. 18, 1934 |
| 2,279,540 | Voth et al. | Apr. 14, 1942 |
| 2,363,107 | Young | Nov. 21, 1944 |
| 2,496,771 | Bolling | Feb. 7, 1950 |
| 2,624,915 | Corson | Jan. 13, 1953 |